United States Patent
Yasui (10) Patent No.: US 10,210,675 B2
(45) Date of Patent: Feb. 19, 2019

(54) FAILURE DETERMINATION SYSTEM FOR VEHICLE SPEED DETECTION DEVICE

(71) Applicant: HONDA MOTOR CO., LTD., Tokyo (JP)

(72) Inventor: Yuji Yasui, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/196,373

(22) Filed: Jun. 29, 2016

(65) Prior Publication Data

US 2017/0004663 A1    Jan. 5, 2017

(30) Foreign Application Priority Data

Jul. 3, 2015    (JP) .................. 2015-134169

(51) Int. Cl.
 *G07C 5/08*    (2006.01)
 *G01P 21/02*   (2006.01)
(52) U.S. Cl.
 CPC ............ *G07C 5/0808* (2013.01); *G01P 21/02* (2013.01)
(58) Field of Classification Search
 CPC ............................... G07C 5/0808; G01P 21/02
 See application file for complete search history.

(56) References Cited

U.S. PATENT DOCUMENTS 4,928,242 A * 5/1990 Suzuki .................... G01P 21/02
                                                        123/479
5,243,523 A   9/1993 Stepper et al.
8,170,741 B2 * 5/2012 Noguchi ............... B60W 10/02
                                                        701/29.1

(Continued)

FOREIGN PATENT DOCUMENTS

DE    103 04 739 A1    8/2004
DE    600 14 498 T2    3/2006

(Continued)

OTHER PUBLICATIONS

J. Adamy, "Non-Linear Systems and Regulations", 2nd edition, Springer-Verlag Berlin Heidelberg, 2014, pp. 83-105.

(Continued)

*Primary Examiner* — Aaron L Troost
(74) *Attorney, Agent, or Firm* — Squire Patton Boggs (US) LLP (57) ABSTRACT

A failure determination system for a vehicle speed detection device, which, in a case where only one vehicle speed detection device is used, can always accurately perform failure determination of the device, and ensure a high marketability, while avoiding increases in manufacturing costs and product prices of the system. An ECU calculates an engine speed, calculates a detected vehicle speed based on a detection signal from a vehicle speed sensor, calculates an estimated total transmission gear ratio indicative of correlation between the detected vehicle speed and the engine speed, stores the estimated total transmission gear ratio, calculates a reference vehicle speed using a value of the estimated total transmission gear ratio, calculated predetermined times earlier, and the engine speed, and determines a failure of the sensor using a for-use-in-monitoring vehicle speed error which indicates an error between the reference vehicle speed and the detected vehicle speed.

7 Claims, 8 Drawing Sheets

(56) References Cited

U.S. PATENT DOCUMENTS

| | | | | |
|---|---|---|---|---|
| 2003/0136596 A1* | 7/2003 | Iriyama | ................ | B60K 31/04 |
| | | | | 180/170 |
| 2004/0158372 A1* | 8/2004 | Schwertfuehrer | ...... | F16H 61/12 |
| | | | | 701/31.7 |
| 2015/0360715 A1* | 12/2015 | Shimizu | ................ | B62D 5/001 |
| | | | | 701/43 |

FOREIGN PATENT DOCUMENTS

| | | |
|---|---|---|
| DE | 10 2007 056 513 A1 | 5/2009 |
| EP | 0 464 406 A2 | 1/1992 |
| JP | S62-2236 A | 1/1987 |
| JP | 2009-128239 A | 6/2009 |

OTHER PUBLICATIONS

German Office Action application No. 10 2016 211 745.9 dated Feb. 6, 2017.
German Search Report application No. 10 2016 211 745.9 dated Feb. 6, 2017.

\* cited by examiner

FAILURE DETERMINATION SYSTEM FOR VEHICLE SPEED DETECTION DEVICE

BACKGROUND OF THE INVENTION

Field of the Invention

The present invention relates to a failure determination system for determining a failure of a vehicle speed detection device.

Description of the Related Art

Conventionally, there has been known a failure determination system for a vehicle speed detection device, disclosed in Japanese Laid-Open Patent Publication (Kokai) No. 2009-128239. This failure determination system is applied to a four-wheel vehicle of a rear-wheel-drive type, and includes a vehicle speed sensor for detecting a rotational speed of an output shaft of a transmission, four wheel speed sensors for detecting rotational speeds of the four wheels, respectively, an ABS (Anti-lock Brake System)-ECU connected to the sensors, and so forth. In the ABS-ECU, ABS control is performed based on detection signals from the four wheel speed sensors, in order to avoid occurrence of a locked state of the wheels.

Further, in the failure determination system, a first vehicle speed is calculated based on a detection signal from the vehicle speed sensor, and a second vehicle speed is calculated based on detection signals from two rear wheel speed sensors. In a case where predetermined failure determination conditions are satisfied, when the absolute value of a vehicle speed difference, which is a difference between the first vehicle speed and the second vehicle speed, is larger than a predetermined value, it is determined that the vehicle speed sensor is faulty.

In the recent functional safety standards (ISO26262), it is required to always monitor whether or not the vehicle speed sensor is faulty. To satisfy this condition, when the failure determination system disclosed in Japanese Laid-Open Patent Publication (Kokai) No. 2009-128239 is applied, two wheel speed sensors are required in addition to the vehicle speed sensor, since a failure of the vehicle speed sensor is determined by the above-described method. However, vehicles used e.g. in developing countries are each provided with a single vehicle speed sensor for detecting a vehicle speed thereof, but a large number of them have no wheel speed sensors other than the vehicle speed sensor, because of lower prices. When the above-described failure determination system is applied to such vehicles, it is required to add two wheel speed sensors, which causes increases in manufacturing costs and product prices, resulting in degraded marketability.

SUMMARY OF THE INVENTION

It is an object of the present invention to provide a failure determination system for a vehicle speed detection device, which is, in a case where only one vehicle speed detection device is used, capable of always performing failure determination of the vehicle speed detection device with accuracy, and ensuring a high marketability, while avoiding increases in manufacturing costs and product prices of the failure determination system.

To attain the above object, the present invention provides a failure determination system for a vehicle speed detection device that outputs a vehicle speed detection signal indicative of a vehicle speed which is a speed of a vehicle, comprising detected vehicle speed calculation means for calculating a detected vehicle speed, which is a detection value of the vehicle speed, based on the vehicle speed detection signal, motive power speed acquisition means for acquiring a motive power speed, which is a speed of a motive power source of the vehicle, correlation parameter calculation means for calculating a correlation parameter indicative of a correlation between the vehicle speed and the motive power speed, storage means for storing the calculated correlation parameter, reference vehicle speed calculation means for calculating a reference vehicle speed, using the correlation parameter calculated at a calculation time earlier than a current time point by a predetermined time period and stored in the storage means, and the motive power speed, and failure determination means for determining a failure of the vehicle speed detection device, using an error parameter indicative of an error between the reference vehicle speed and the detected vehicle speed.

With the configuration of this failure determination system for the vehicle speed detection device, the detected vehicle speed, which is the detection value of the vehicle speed, is calculated based on the vehicle speed detection signal, and the motive power speed, which is the speed of the motive power source of the vehicle, is acquired. The correlation parameter indicative of the correlation between the vehicle speed and the motive power speed is calculated, and the calculated correlation parameter is stored. Further, the reference vehicle speed is calculated using the correlation parameter calculated at the calculation time the predetermined time period earlier than the current time point and stored in the storage means, and the motive power speed. Then, a failure of the vehicle speed detection device is determined using the error parameter indicative of an error between the reference vehicle speed and the detected vehicle speed. In this case, since a general vehicle includes motive power speed acquisition means for acquiring a motive power speed, it is possible to always perform failure determination of the vehicle speed detection device, using such motive power speed acquisition means, without adding a wheel speed sensor as disclosed in Japanese Laid-Open Patent Publication (Kokai) No. 2009-128239. That is, it is possible to realize the failure determination system that satisfies the functional safety standards (ISO26262).

In addition to this, in a case where an estimated value of the vehicle speed at the current time point is calculated using a correlation parameter at the current time point, and failure determination of the vehicle speed detection device is performed by comparing the estimated value and the detected vehicle speed, determination accuracy of the failure is lowered due to reduction of reliability of the estimated value of the vehicle speed, under a condition that there is a possibility of occurrence of a failure at a time earlier than the current time point. However, according to the above failure determination system, the reference vehicle speed is calculated using the correlation parameter calculated at the calculation time the predetermined time period earlier than the current time point and the motive power speed, and hence by setting the calculation time the predetermined time period earlier to a time at which it was determined that no failure occurred in the vehicle speed detection device, it is possible to calculate the reference vehicle speed as a vehicle speed with high reliability. As described above, according to the failure determination system, it is possible to always perform failure determination of the vehicle speed detection device with accuracy, and ensure a high marketability, while avoiding increases in manufacturing costs and product prices (note that throughout the description, the term "acquire" used in phrases "acquiring the motive power speed" is intended to mean not only directly acquiring the motive power speed e.g. by sensors but also calculating the motive power speed based on other parameters).

Preferably, the error parameter is a vehicle speed error which is a difference between one and the other of the reference vehicle speed and the detected vehicle speed, and the failure determination means determines the failure of the vehicle speed detection device, using a differential value of a Liapounov function of the vehicle speed error.

With the configuration of the preferred embodiment, the vehicle speed error, which is the difference between one and the other of the reference vehicle speed and the detected vehicle speed, is calculated as the error parameter, and a failure of the vehicle speed detection device is determined using the differential value of the Liapounov function of the vehicle speed error. In general, the Liapounov function is known as a function for evaluating an error convergence behavior. The differential value of the Liapounov function indicates that an error is converging to 0 when it is a negative value, whereas when the differential value is a positive value, it indicates that an error is increasing. Therefore, according to the failure determination system, by determining a failure of the vehicle speed detection device using the differential value of the Liapounov function of the vehicle speed error, it is possible to quickly obtain a result of the failure determination with high accuracy. That is, it is possible to determine a failure of the vehicle speed detection device in a short time period, thereby making it possible to improve marketability.

Preferably, the error parameter is a vehicle speed error which is a difference between one and the other of the reference vehicle speed and the detected vehicle speed, and the failure determination means determines the failure of the vehicle speed detection device, using an integrated value obtained by integrating at least one of a differential value of a Liapounov function of the vehicle speed error and the vehicle speed error, for a predetermined calculation time period.

With the configuration of the preferred embodiment, the vehicle speed error, which is the difference between the one and the other of the reference vehicle speed and the detected vehicle speed, is calculated as the error parameter, and the failure of the vehicle speed detection device is determined using the integrated value obtained by integrating at least one of differential value of the Liapounov function of the vehicle speed error and the vehicle speed error for the predetermined calculation time period. As described above, it is possible to determine whether an error is increasing or converging to 0, according to the positive or negative value of the differential value of the Liapounov function. Further, in a case where the integrated value obtained by integrating the differential value of the Liapounov function of the vehicle speed error and/or the vehicle speed error for the predetermined calculation time period is used, it is possible to improve an S/N ratio of the calculation result, compared with a case where a calculated value is used which is obtained by a calculation of the differential value of the Liapounov function of the vehicle speed error and/or the vehicle speed error, one time. This makes it possible to improve the calculation accuracy. Therefore, according to the failure determination system, the failure of the vehicle speed detection device is determined using the integrated value obtained by integrating at least one of the differential value of the Liapounov function of the vehicle speed error and the vehicle speed error for the predetermined calculation time period, whereby it is possible to further improve the accuracy of the failure determination, and further improve marketability.

More preferably, the correlation parameter calculation means calculates an estimated vehicle speed based on the correlation parameter and the motive power speed, calculates an estimated error between the detected vehicle speed and the estimated vehicle speed, and calculates the correlation parameter with a predetermined control algorithm such that the estimated error becomes minimum, and the predetermined calculation time period is set to a value longer than a time period to be taken before the estimated error converges to a minimum value thereof.

With the configuration of the preferred embodiment, the estimated vehicle speed is calculated based on the correlation parameter calculated at a calculation time one time earlier than the current time point, and the motive power speed, and the estimated error between the detected vehicle speed and the estimated vehicle speed is calculated. Then, the correlation parameter is calculated with the predetermined control algorithm such that the estimated error becomes minimum. In this case, although the predetermined calculation time period is set to the value longer than the time period to be taken before the estimated error converges to the minimum value, the failure determination of the vehicle speed detection device is performed using the integrated value obtained by integrating at least one of the differential value of the Liapounov function of the vehicle speed error and the vehicle speed error for the predetermined calculation time period, so that the failure determination is performed after the estimated error converges to the minimum value thereof, whereby it is possible to further improve the accuracy of the failure determination.

Preferably, the correlation parameter calculation means calculates an estimated vehicle speed based on the correlation parameter calculated at a calculation time one time earlier than the current time point and the motive power speed, calculates an estimated error between the detected vehicle speed and the estimated vehicle speed, and calculates the correlation parameter with a predetermined control algorithm such that the estimated error becomes minimum, and the predetermined time period is set to a value longer than a time period to be taken before the estimated error converges to a minimum value thereof.

With the configuration of the preferred embodiment, the estimated vehicle speed is calculated based on the correlation parameter calculated at the calculation time one time earlier than the current time point and the motive power speed, the estimated error is calculated between the detected vehicle speed and the estimated vehicle speed, and the correlation parameter is calculated with the predetermined control algorithm such that the estimated error becomes minimum. In this case, although the predetermined calculation time period is set to the value longer than the time period to be taken before the estimated error converges to the minimum value, the failure determination of the vehicle speed detection device is performed using the correlation parameter calculated at the calculation time the predetermined time period earlier than the current time point, so that the failure determination is performed after the estimated error converges to the minimum value thereof, whereby it is possible to further improve the accuracy of the failure determination.

Preferably, the failure determination means determines the failure of the vehicle speed detection device, using the error parameter calculated when the motive power of the motive power source is in a state transmittable to drive wheels of the vehicle.

In general, when the failure determination of the vehicle speed detection device is performed in a state where the motive power of the motive power source is not transmitted to the drive wheels, this can cause erroneous determination. However, with the configuration of the preferred embodiment, the failure of the vehicle speed detection device is determined using the error parameter used when the motive power of the motive power source is in the state transmittable to drive wheels of the vehicle, so that it is possible to avoid erroneous determination mentioned above, whereby it is possible to further improve the determination accuracy.

Preferably, the reference vehicle speed calculation means calculates the reference vehicle speed, using the correlation parameter calculated when it was determined the predetermined time period earlier than the current time point that the vehicle speed detection device is normal, and the motive power speed.

With the configuration of the preferred embodiment, the failure determination of the vehicle speed detection device is performed using the correlation parameter calculated when it was determined that the vehicle speed detection device is normal and the motive power speed, and hence by performing failure determination of the vehicle speed detection device using the reference vehicle speed thus calculated, it is possible to further improve the determination accuracy.

The above and other objects, features, and advantages of the present invention will become more apparent from the following detailed description taken in conjunction with the accompanying drawings.

DETAILED DESCRIPTION OF PREFERRED EMBODIMENTS

Hereafter, a failure determination system for a vehicle speed detection device, according to an embodiment of the present invention, will be described with reference to the drawings. The failure determination system 1 of the present embodiment determines a failure of a vehicle speed sensor 20 as the vehicle speed detection device installed on a vehicle V shown in FIG. 1. The vehicle V is a four-wheel vehicle, and includes an ECU 2, an engine 3, a clutch 4, a manual transmission 5, left and right drive wheels 6 and 6, left and right driven wheels (not shown), and various sensors 20 to 24.

Figure 1:
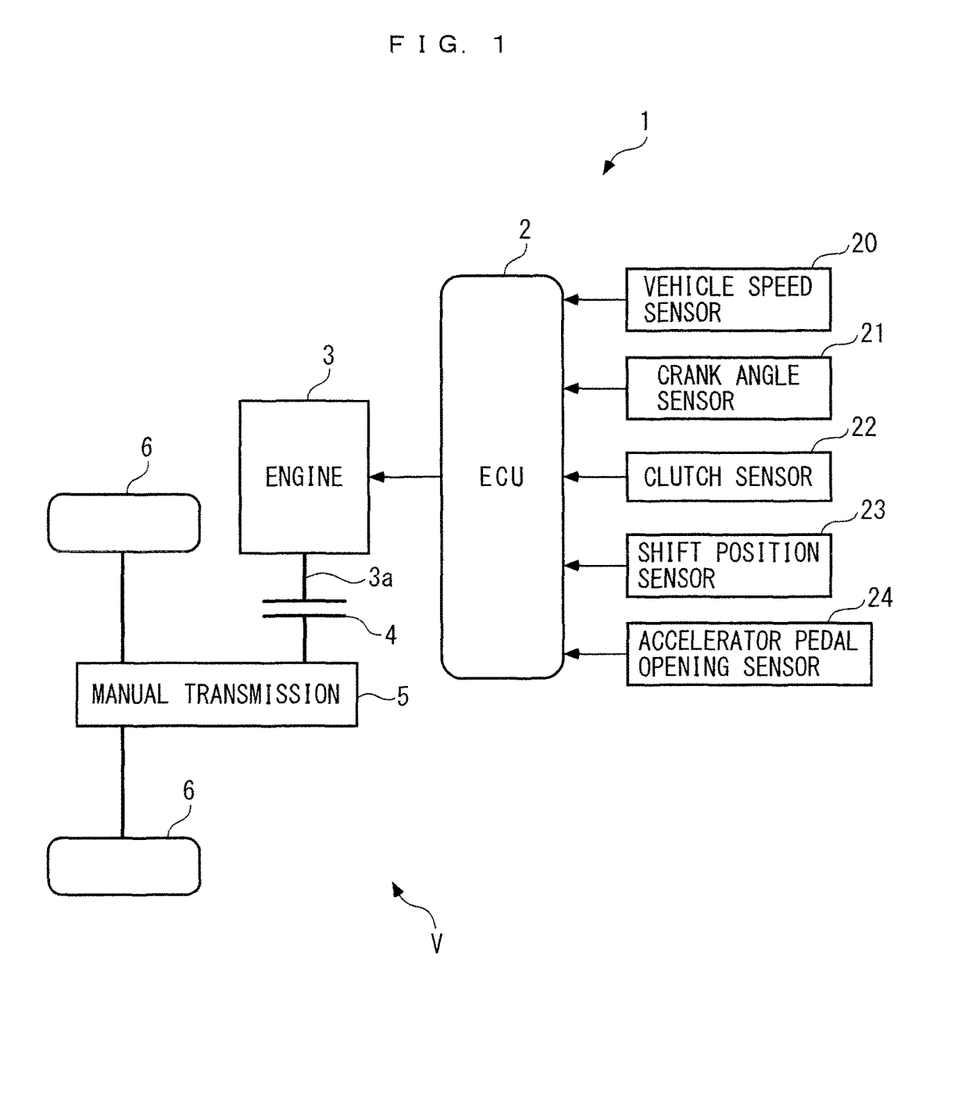
FIG. 1 is a schematic diagram of a failure determination system according to an embodiment of the present invention and a vehicle including a vehicle speed detection device to which the failure determination system is applied.

The engine 3 is a gasoline engine installed on the vehicle V as a motive power source, and operating states thereof are controlled by the ECU 2. A crankshaft 3a of the engine 3 is connected to the manual transmission 5 via the clutch 4, whereby when the clutch 4 is engaged, and at the same time the manual transmission 5 is in an in-gear state (i.e. a state where the motive power of the engine can be transmitted while changing the speed of the motive power at a transmission gear ratio of a selected speed position), the motive power of the engine 3 is transmitted to the drive wheels 6 and 6 via the clutch 4 and the manual transmission 5.

Note that in the following description, a state in which the clutch 4 is engaged, and at the same time the manual transmission 5 is in the in-gear state, thereby enabling the motive power of the engine 3 to be transmitted to the drive wheels 6 and 6, is referred to as the "connected state of the transmission", whereas a state in which the motive power of the engine cannot be transmitted to the drive wheels 6 and 6 is referred to as the "disconnected state of the transmission".

On the other hand, the vehicle speed sensor 20, a crank angle sensor 21, a clutch sensor 22, a shift position sensor 23, and an accelerator pedal opening sensor 24 are electrically connected to the ECU 2. The vehicle speed sensor 20 detects a vehicle speed which is a speed of the vehicle V, and delivers a vehicle speed detection signal indicative of the detected vehicle speed to the ECU 2. The ECU 2 calculates a detected vehicle speed Vact (unit: km/h) based on the vehicle speed detection signal.

Further, the crank angle sensor 21 delivers a CRK signal, which is a pulse signal, to the ECU 2 along with rotation of the crankshaft 3a. Each pulse of the CRK signal is delivered whenever the crankshaft 3a rotates through a predetermined crank angle (e.g. 1°). The ECU 2 calculates an engine speed Es (unit: rpm) based on the CRK signal. Note that in the present embodiment, the crank angle sensor 21 corresponds to motive power speed acquisition means, and the engine speed Es corresponds to a motive power speed.

Furthermore, the clutch sensor 22 detects the amount of a step-on operation of a clutch pedal (not shown) of the vehicle V, and delivers a detection signal indicative of the detected amount of the step-on operation to the ECU 2. The ECU 2 determines the engaged/disengaged state of the clutch 4 based on the detection signal from the clutch sensor 22.

On the other hand, the shift position sensor 23 detects a shift position which is a position of a shift lever (not shown) of the manual transmission 5, and delivers a detection signal indicative of the detected shift position to the ECU 2. The ECU 2 determines whether or not the manual transmission 5 is in the in-gear state, based on the detection signal from the shift position sensor 23.

Further, the accelerator pedal opening sensor 24 detects a stepped-on amount AP of an accelerator pedal (not shown) of the vehicle V (hereinafter referred to as the "accelerator pedal opening AP"), and delivers a detection signal indicative of the detected accelerator pedal opening AP to the ECU 2.

Furthermore, the ECU 2 is implemented by a microcomputer comprised of a CPU, a RAM, a ROM, and an I/O interface (none of which are shown). The ECU 2 performs various control processes including a sensor monitoring process, as described hereinafter, based on the detection signals from the above-described sensors 20 to 24.

Note that in the present embodiment, the ECU 2 corresponds to detected vehicle speed calculation means, the motive power speed acquisition means, correlation parameter calculation means, storage means, reference vehicle speed calculation means, and failure determination means.

Next, the sensor monitoring process according to the present embodiment will be described with reference to FIG. 2. In the sensor monitoring process, an operating state of the vehicle speed sensor 20 is always monitored to determine whether or not a failure has occurred in the vehicle speed sensor 20, and the sensor monitoring process is performed by the ECU 2 at a predetermined control period DT (e.g. 100 msec). Note that various calculated or set values, referred to hereinafter, are stored in the RAM of the ECU 2, and values of various flags, referred to hereinafter, are reset to 0 at the start of the engine 3.

Further, in the description hereinafter, discrete data with a symbol (k) indicates that it is data calculated at the predetermined control period DT, and the symbol k (k is a positive integer) indicates a position in the sequence of calculating cycles of respective discrete data. For example, the symbol k indicates that discrete data therewith is a value calculated at the current calculation time, and a symbol k−1 indicates that discrete data therewith is a value calculated at the immediately preceding calculation time. Further, in the following description, the symbol (k) indicating that discrete data therewith is the current value of the discrete data is omitted as deemed appropriate.

Figure 2:
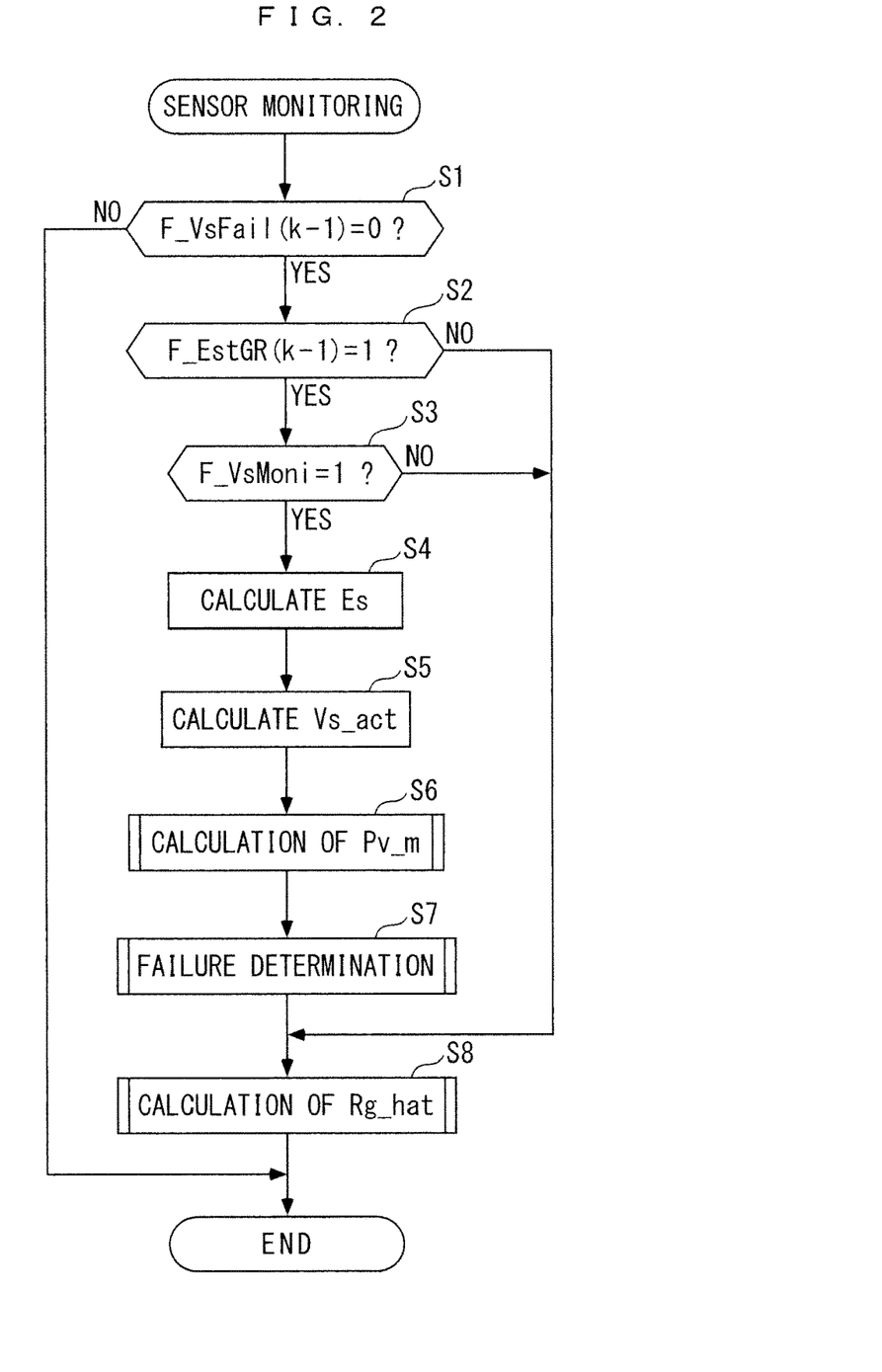
FIG. 2 is a flowchart of a sensor monitoring process.

As shown in FIG. 2, first, in a step 1 (shown as Si in abbreviated form in FIG. 2; the following steps are also shown in abbreviated form), it is determined whether or not an immediately preceding value F_VsFail (k−1) of a sensor failure flag is equal to 0.

The sensor failure flag F_VsFail indicates whether or not a failure has occurred in the vehicle speed sensor 20, and a value thereof is set as described hereinafter. If the answer to the question of the step 1 is negative (NO), i.e. if a failure occurred in the vehicle speed sensor 20 at the immediately preceding control time, it is determined that the sensor monitoring process should be terminated, and the present process is immediately terminated.

On the other hand, if the answer to the question of the step 1 is affirmative (YES), i.e. if the vehicle speed sensor 20 was normal at the immediately preceding control time, the process proceeds to a step 2, wherein it is determined whether or not an immediately preceding value F_EstGR (k−1) of a transmission gear ratio use condition flag is equal to 0.

The transmission gear ratio use condition flag F_EstGR indicates whether or not a calculation result of an estimated total transmission gear ratio Rg_hat, referred to hereinafter, is in a usable state (has a usable accuracy), and a value thereof is set in a various condition determination process, described hereinafter with reference to FIG. 6.

If the answer to the question of the step 2 is negative (NO), the process proceeds to a step 8, referred to hereinafter. On the other hand, if the answer to the question of the step 2 is affirmative (YES), i.e. if the calculation result of the estimated total transmission gear ratio Rg_hat was in the usable state at the immediately preceding control time, the process proceeds to a step 3, wherein it is determined whether or not a sensor monitoring condition flag F_VsMoni is equal to 1. The sensor monitoring condition flag F_VsMoni indicates whether or not conditions for monitoring the vehicle speed sensor 20 are satisfied, and a value thereof is set in the various condition determination process, described hereinafter with reference to in FIG. 6.

If the answer to the question of the step 3 is negative (NO), the process proceeds to the step 8, referred to hereinafter. On the other hand, if the answer to the question of the step 3 is affirmative (YES), i.e. if the conditions for monitoring the vehicle speed sensor 20 are satisfied, the process proceeds to a step 4, wherein the engine speed Es is calculated based on the above-mentioned CRK signal.

Then, the process proceeds to a step 5, wherein a detected vehicle speed Vs_act is calculated based on the vehicle speed detection signal.

Next, in a step 6, a process for calculating a for-use-in-failure determination value Pv_m is performed. The for-use-in-failure determination value Pv_m (integrated value) is used for failure determination of the vehicle speed sensor 20, and is specifically calculated, as described hereafter with reference to FIG. 3.

Figure 3:
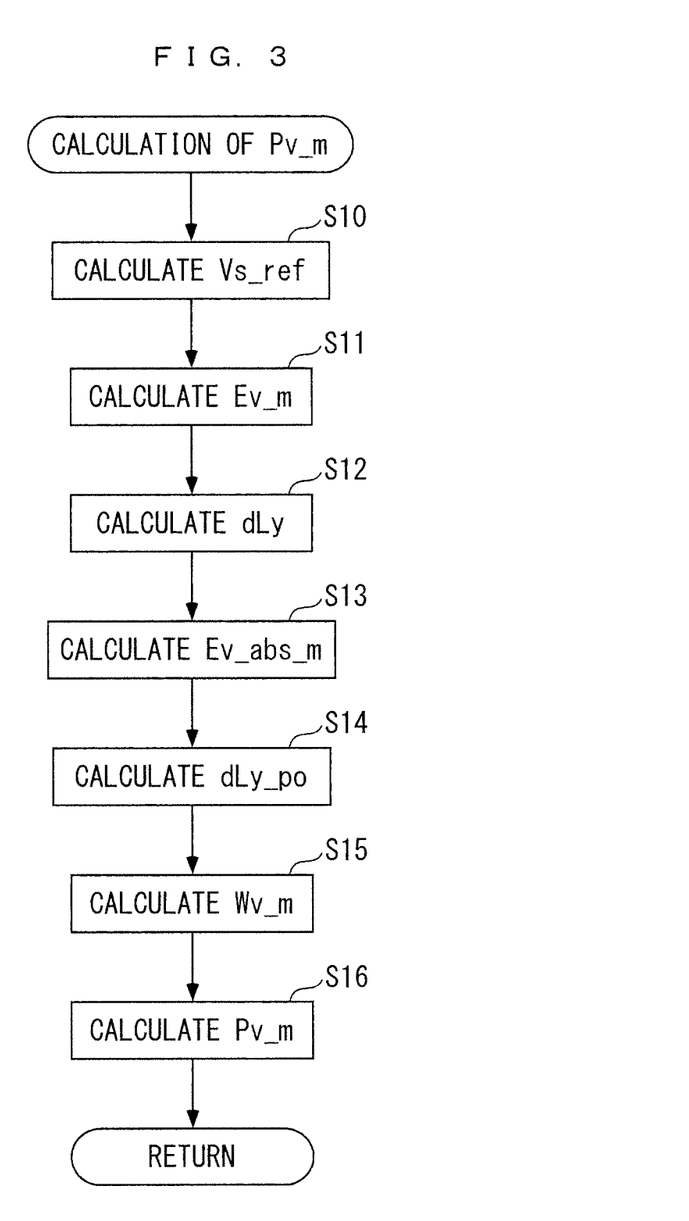
FIG. 3 is a flowchart of a process for calculating a for-use-in-failure determination value.

Referring to FIG. 3, first, in a step 10, a reference vehicle speed Vs_ref (unit: km/h) is calculated by the following equation (1):

$$Vs\_ref(k) = Rg\_hat(k-nw) \cdot Es(k) \qquad (1)$$

As shown in this equation (1), the reference vehicle speed Vs_ref is calculated as the product of a value Rg_hat (k−nw) of the estimated total transmission gear ratio, calculated at a control time nw times earlier, and the engine speed Es. The symbol "nw" represents a monitoring time period value that defines a monitoring time period over which the vehicle speed sensor 20 is monitored, and is set to a positive predetermined value which makes a monitoring time period DT·nw determined by the monitoring time period value nw sufficiently longer than a time period to be taken before a for-use-in-estimation vehicle speed error Ev_id, referred to hereinafter, converges to a minimum value (0) thereof.

In this case, the process for calculating the for-use-in-failure determination value Pv_m in the step 6 is performed when the answer to the question of the above-mentioned step 1 is affirmative (YES), i.e. when the vehicle speed sensor 20 was normal at the immediately preceding control time, so that the value Rg_hat (k−nw) of the estimated total transmission gear ratio, calculated at the control time nw times earlier, can also be regarded as a value calculated when the vehicle speed sensor 20 was normal. That is, the reference vehicle speed Vs_ref is calculated as a vehicle speed calculated from the estimated total transmission gear ratio Rg_hat acquired when the vehicle speed sensor 20 was normal. Further, since the unit of the reference vehicle speed Vs_ref is km/h, and the unit of the engine speed Es is rpm, the estimated total transmission gear ratio Rg_hat is set not to a dimensionless value but to a value of a dimension which enables the unit of rpm to be converted to the unit of km/h.

Then, the process proceeds to a step 11, wherein a for-use-in-monitoring vehicle speed error Ev_m is calculated by the following equation (2). Note that in the present embodiment, the for-use-in-monitoring vehicle speed error Ev_m corresponds to an error parameter and a vehicle speed error.

$$Ev\_m(k) = Vs\_act(k) - Vs\_ref(k) \qquad (2)$$

In a step 12 following the step 11, a function differential value dLy is calculated by the following equation (3). The function differential value dLy is a differential value of a Liapounov function Ly, referred to hereinafter, and in the present embodiment, corresponds to a differential value of a Liapounov function of the vehicle speed error.

$$dLy(k) = Ev\_m(k) \cdot [Ev\_m(k) - Ev\_m(k-1)] \qquad (3)$$

Then, the process proceeds to a step 13, wherein an error absolute value Ev_abs_m is calculated by the following equation (4):

$$Ev\_abs\_m(k)=|Ev\_m(k)| \qquad (4)$$

Next, in a step 14, a positive differential value dLy_po is calculated by the following equations (5) and (6):

When $dLy(k) \leq 0$ $$dLy\_po(k)=dLy(k) \qquad (5)$$

When $dLy(k)<0$ $$dLy\_po(k)=0 \qquad (6)$$

In a step 15 following the step 14, a weighted error Wv_m is calculated by the following equation (7):

$$Wv\_m(k)=K\_vm \cdot dLy\_po(k)+(1-K\_vm) \cdot Ev\_abs\_m(k) \qquad (7)$$

In this equation (7), K_vm represents a weighting factor set such that $0 \leq K\_vm \leq 1$ holds. In the case of the present embodiment, the weighting factor K_vm is set such that $0<K\_vm<1$ holds. As shown in the equation (7), the weighted error Wv_m is calculated as a weighted average value of the positive differential value dLy_po and the error absolute value Ev_abs_m. The reason for this will be described hereinafter.

Then, the process proceeds to a step 16, wherein the for-use-in-failure determination value Pv_m is calculated by the following equation (8):

$$Pv\_m(k) = \sum_{i=0}^{np} Wv\_m(k-i) \qquad (8)$$

In this equation (8), np represents an integration count value that defines the number of times of integration of the weighted error Wv_m in the for-use-in-failure determination value Pv_m. In the present embodiment, the integration count value np is set to a value equal to the monitoring time period value nw. As shown in the equation (8), the for-use-in-failure determination value Pv_m is calculated as an integrated value of np weighted errors Wv_m calculated for an integration time period DT·np (predetermined calculation time period) between the current control time and the control time np times earlier than the current control time.

Referring again to FIG. 2, after the for-use-in-failure determination value Pv_m is thus calculated in the step 6, the process proceeds to a step 7, wherein a failure determination process is performed. The failure determination process is specifically performed, as described hereafter with reference to FIG. 4.

Figure 4:
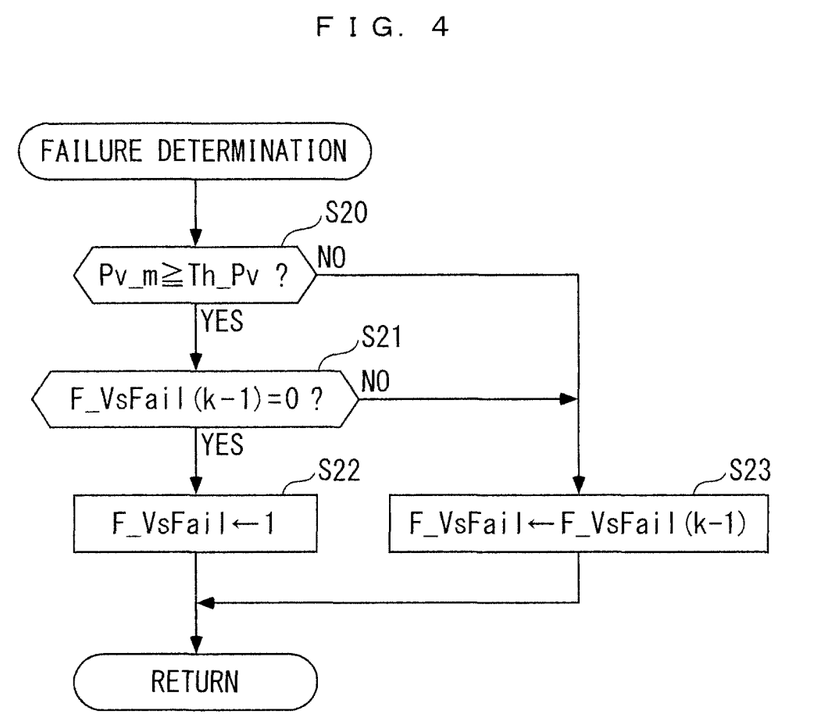
FIG. 4 is a flowchart of a failure determination process.

Referring to FIG. 4, first, in a step 20, it is determined whether or not the for-use-in-failure determination value Pv_m is not smaller than a predetermined threshold value Th_Pv. If the answer to this question is affirmative (YES), the process proceeds to a step 21, wherein it is determined whether or not the immediately preceding value F_VsFail (k−1) of the sensor failure flag is equal to 0.

If the answer to the question of the step 21 is affirmative (YES), it is determined that a failure has occurred in the vehicle speed sensor 20 in the current control time, and to indicate the fact, the process proceeds to a step 22, wherein the sensor failure flag F_VsFail is set to 1, followed by terminating the present process.

On the other hand, if the answer to the question of the above-mentioned step 20 or 21 is negative (NO), i.e. if Pv_m<Th_Pv holds, or if a failure occurred in the vehicle speed sensor 20 at the immediately preceding or earlier control time, the process proceeds to a step 23, wherein the sensor failure flag F_VsFail is set to the immediately preceding value F_VsFail (k−1) thereof, followed by terminating the present process.

As described above, the failure determination of the vehicle speed sensor 20 is performed by comparing the for-use-in-failure determination value Pv_m with the predetermined threshold value Th_Pv. In this case, there is a possibility that the above-mentioned function differential value dLy and each of the for-use-in-monitoring vehicle speed error Ev_m indicates a positive or negative value, and hence in a case where the above-mentioned weighted error Wv_m is calculated as a weighted average value of the function differential value dLy and the for-use-in-monitoring vehicle speed error Ev_m, there is a possibility that the for-use-in-failure determination value Pv_m which is an integrated value of the weighted errors Wv_m not only increases but also temporarily decreases. This causes longer time to be taken, under a condition that the vehicle speed sensor 20 is faulty, before a result of the failure determination of the vehicle speed sensor 20 is obtained. Therefore, in the present embodiment, to quickly obtain the result of the failure determination of the vehicle speed sensor 20 under the condition that the vehicle speed sensor 20 is faulty, the weighted error Wv_m is calculated as the weighted average value of the positive differential value dLy_po and the error absolute value Ev_abs_m.

Referring again to FIG. 2, in the step 8 following the above step 2, 3, or 7, a process for calculating the estimated total transmission gear ratio Rg_hat as a correlation parameter is performed. This calculation process is specifically performed, as described hereafter with reference to FIG. 5.

Figure 5:
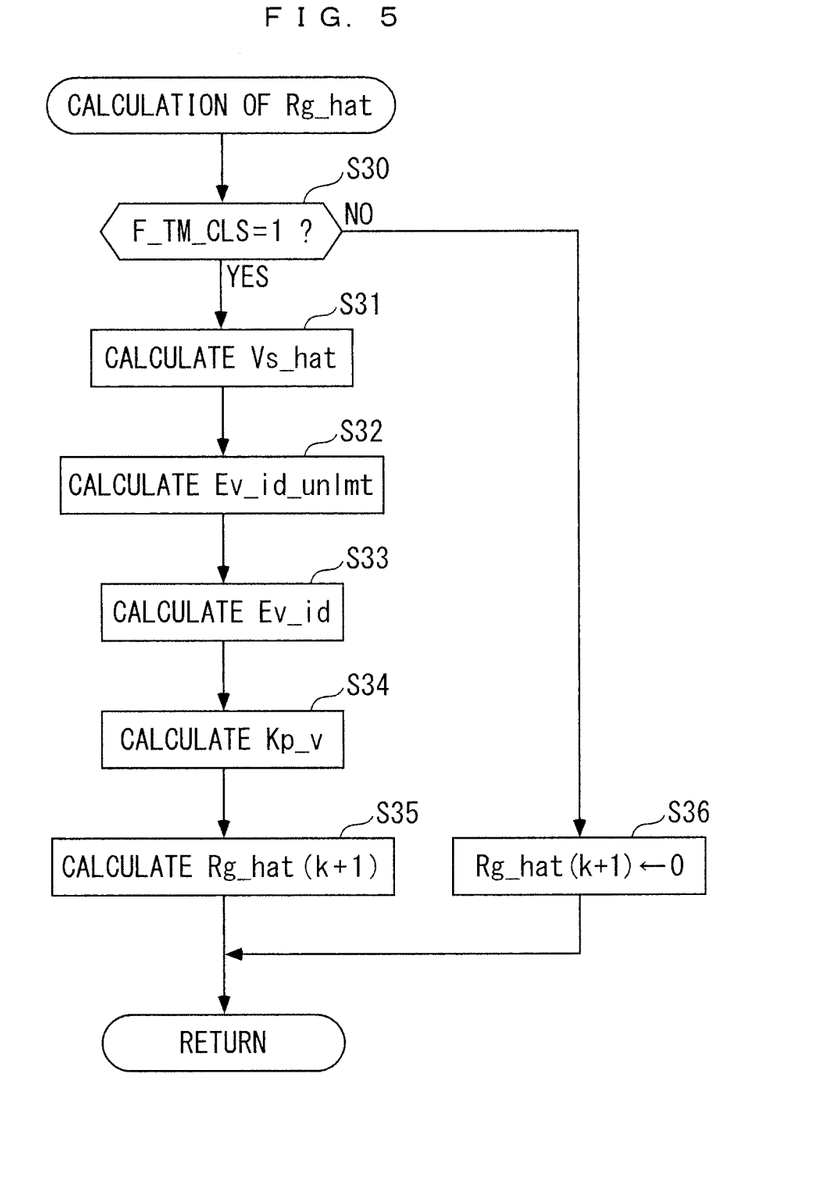
FIG. 5 is a flowchart of a process for calculating an estimated total transmission gear ratio.

Referring to FIG. 5, in a step 30, it is determined whether or not a transmission connection flag F_TM_CLS is equal to 1. The transmission connection flag F_TM_CLS indicates whether or not the transmission is in the connected state, and a value thereof is set in the various condition determination process, described hereinafter with reference to in FIG. 6.

If the answer to the question of the step 30 is affirmative (YES), i.e. if the transmission is in the connected state, the process proceeds to a step 31, wherein an estimated vehicle speed Vs_hat is calculated by the following equation (9):

$$Vs\_hat(k)=Rg\_hat(k) \cdot Es(k) \qquad (9)$$

Then, the process proceeds to a step 32, wherein a pre-limitation for-use-in-estimation vehicle speed error Ev_id_unlmt is calculated by the following equation (10):

$$Ev\_id\_unlmt(k)=Vs\_act(k)-Vs\_hat \qquad (10)$$

Next, in a step 33, the for-use-in-estimation vehicle speed error Ev_id (estimated error) is calculated by limiting calculation processing expressed by the following equations (11) to (13):

When $Ev\_id\_lmt<Ev\_id\_unlmt(k)$ $$Ev\_id(k)=Ev\_id\_lmt \qquad (11)$$

When $-Ev\_id\_lmt \leq Ev\_id\_unlmt(k) \leq Ev\_id\_lmt$ $$Ev\_id(k)=Ev\_id\_unlmt \qquad (12)$$

When $Ev\_id\_unlmt(k)<-Ev\_id\_lmt$ $$Ev\_id(k)=-Ev\_id\_lmt \qquad (13)$$

Ev_id_lmt in the above equations (11) to (13) represents a predetermined limit value (>0).

In a step 34 following the step 33, an identification gain Kp_v is calculated by the following equation (14):

$$Kp\_v(k) = \frac{Pv \cdot Es(k)}{1 + Pv \cdot Es(k)^2} \quad (14)$$

In this equation (14), Pv represents a predetermined fixed gain value (>0).

Then, the process proceeds to a step 35, wherein a next-time value Rg_hat (k+1) of the estimated total transmission gear ratio is calculated with an identification algorithm expressed by the following equation (15) such that the for-use-in-estimation vehicle speed error Ev_id becomes minimum (i.e. becomes equal to 0), followed by terminating the present process. The next-time value Rg_hat (k+1) of the estimated total transmission gear ratio is used for calculating the estimated vehicle speed Vs_hat in the above-mentioned step at the next control time. That is, in the above-mentioned step 31, the estimated total transmission gear ratio Rg_hat calculated at a calculation time one time earlier is used.

$$Rg\_hat(k+1) = Rg\_hat(k) + Kp\_v(k) \cdot Ev\_id(k) \quad (15)$$

On the other hand, if the answer to the question of the above-mentioned step 30 is negative (NO), i.e. if the transmission is in the disconnected state, the process proceeds to a step 36, wherein the next-time value Rg_hat (k+1) of the estimated total transmission gear ratio is set to 0, followed by terminating the present process.

Referring again to FIG. 2, in the step 8, the process for calculating the estimated total transmission gear ratio Rg_hat is performed, as described above, and then the sensor monitoring process is terminated.

Next, the various condition determination process will be described with reference to FIG. 6. This process sets values of the above-described various flags, and is performed by the ECU 2 at a predetermined control period.

Figure 6:
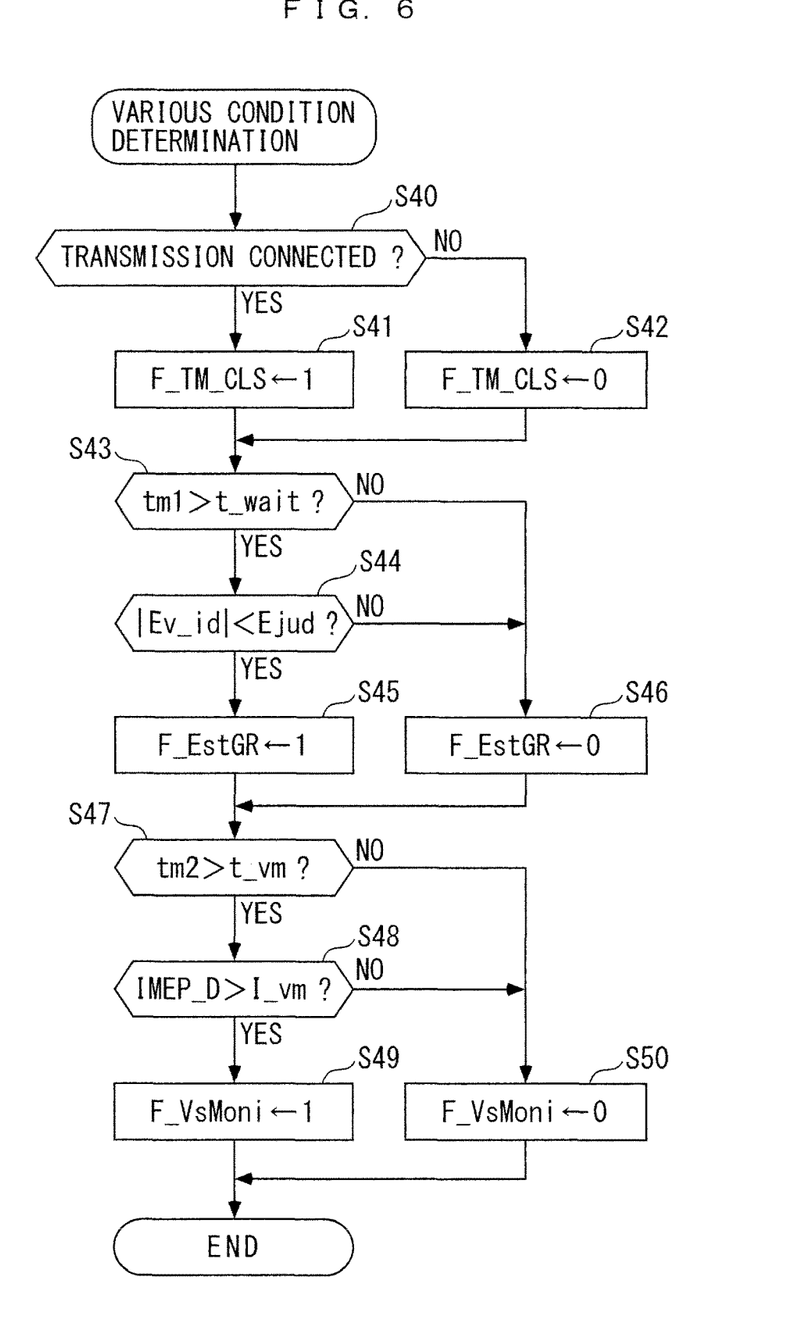
FIG. 6 is a flowchart of a various condition determination process.

Referring to FIG. 6, first, in a step 40, it is determined, based on the detection signals from the clutch sensor 22 and the shift position sensor 23, whether or not the transmission is in the connected state. If the answer to this question is affirmative (YES), i.e. if the transmission is in the connected state, to indicate the fact, the process proceeds to a step 41, wherein the above-mentioned transmission connection flag F_TM_CLS is set to 1.

On the other hand, if the answer to the question of the step 40 is negative (NO), i.e. if the transmission is in the disconnected state, to indicate the fact, the process proceeds to a step 42, wherein the above-mentioned transmission connection flag F_TM_CLS is set to 0.

In a step 43 following the above step 41 or 42, it is determined whether or not a count value tm1 of a transmission connection time timer is larger than a predetermined value t_wait. The transmission connection time timer counts time over which F_TM_CLS=1 continues after the transmission connection flag F_TM_CLS is switched from 0 to 1.

If the answer to the question of the step 43 is affirmative (YES), i.e. if a time period exceeding a value DT·t_wait has elapsed after a time point when the transmission was connected, the process proceeds to a step 44, wherein it is determined whether or not an absolute value |Ev_id| of the for-use-in-estimation vehicle speed error is smaller than a predetermined reference value Ejud.

If the answer to the question of the step 44 is affirmative (YES), it is determined that the calculation result of the estimated total transmission gear ratio Rg_hat is in the usable state, and to indicate the fact, the process proceeds to a step 45, wherein the above-mentioned transmission gear ratio use condition flag F_EstGR is set to 1.

On the other hand, if the answer to the question of the above-mentioned step 43 or 44 is negative (NO), i.e. if tm1≤t_wait or |Ev_id|≥Ejud holds, it is determined that the calculation result of the estimated total transmission gear ratio Rg_hat is not in the usable state, and to indicate the fact, the process proceeds to a step 46, wherein the above-mentioned transmission gear ratio use condition flag F_EstGR is set to 0.

In a step 47 following the above step 45 or 46, it is determined whether or not a count value tm2 of a monitoring wait timer is larger than a predetermined value t_vm. The monitoring wait timer counts time over which F_EstGR=1 continues after the above transmission gear ratio use condition flag F_EstGR is switched from 0 to 1.

If the answer to the question of the step 47 is affirmative (YES), i.e. if a time period exceeding a value DT·t_vm has elapsed after a time point when the calculation result of the estimated total transmission gear ratio Rg_hat became usable, the process proceeds to a step 48, wherein it is determined whether or not a demanded value IMEP_D of an indicated mean effective pressure is larger than a predetermined reference value I_vm.

The demanded value IMEP_D of the indicated mean effective pressure is a value indicating an indicated mean effective pressure demanded of the engine 3 by a driver of the vehicle V, and specifically, it is calculated by searching a map (not shown) according to the accelerator pedal opening AP and the engine speed Es.

If the answer to the question of the step 48 is affirmative (YES), it is determined that the conditions for monitoring the vehicle speed sensor 20 are satisfied, and to indicate the fact, the process proceeds to a step 49, wherein the above-mentioned sensor monitoring condition flag F_VsMoni is set to 1, followed by terminating the present process.

On the other hand, if the answer to the question of the above-mentioned step 47 or 48 is negative (NO), i.e. if tm2≤t_vm or IMEP_D≤I_vm holds, it is determined that the conditions for monitoring the vehicle speed sensor 20 are not satisfied, and to indicate the fact, the process proceeds to a step 50, wherein the above-mentioned sensor monitoring condition flag F_VsMoni is set to 0, followed by terminating the present process.

Next, a description will be given of the principle of a method of determining a failure of the vehicle speed sensor 20 in the failure determination system 1 according to the present embodiment. First, the relationship between the estimated vehicle speed Vs_hat, which is an estimated value of the vehicle speed of the vehicle V, and the engine speed Es is defined as the above-mentioned model equation (9).

When a modeling error expressed by the model equation (9) is defined as a difference between the detected vehicle speed Vs_act and the estimated vehicle speed Vs_hat, and the limiting calculation processing is performed on this modeling error, the above-mentioned equations (10) to (13) are derived, and the for-use-in-estimation vehicle speed error Ev_id is calculated by the equations (10) to (13). Then, when the identification algorithm is applied such that the for-use-in-estimation vehicle speed error Ev_id becomes minimum (i.e. becomes equal to 0), the above-mentioned equations (14) and (15) are derived, and the estimated total transmission gear ratio Rg_hat is calculated by the equations (14) and (15).

Figure 7A:
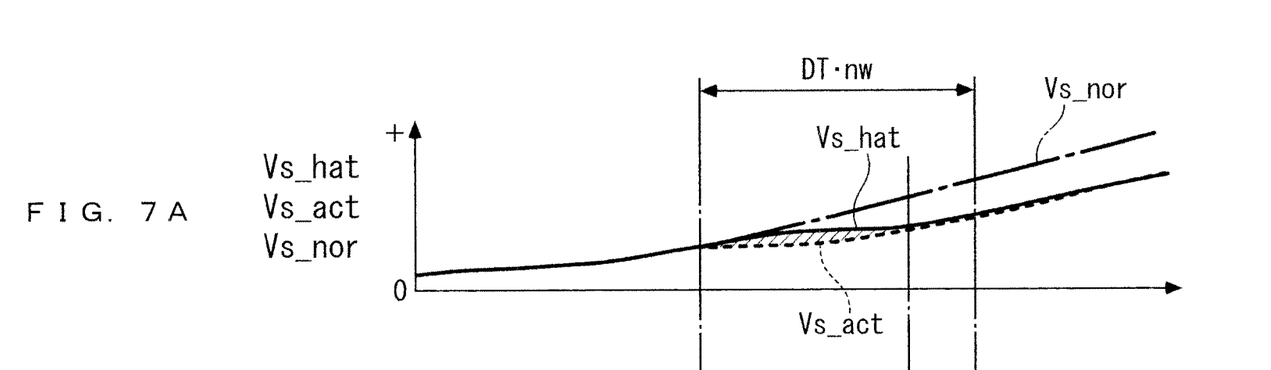
FIG. 7A is a timing diagram showing results of simulations of an estimated vehicle speed and a detected vehicle speed acquired when a failure has occurred in a vehicle speed sensor.
Figure 7B:
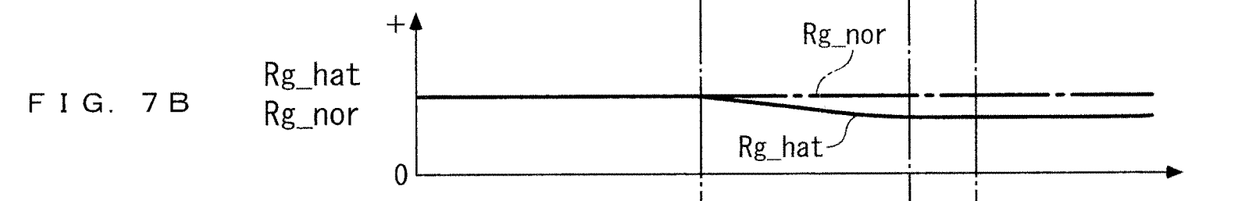
FIG. 7B is a timing diagram showing results of simulations of the estimated total transmission gear ratio obtained when the failure has occurred in the vehicle speed sensor.

Further, in a case where the estimated total transmission gear ratio Rg_hat is calculated as described above, results of simulations of the estimated vehicle speed Vs_hat, the detected vehicle speed Vs_act, and the estimated total transmission gear ratio Rg_hat, when a failure occurs in the vehicle speed sensor 20, are as shown in FIGS. 7A and 7B. A curve indicated by a one-dot chain line in FIG. 7A indicates a result of a simulation of a normal time vehicle speed Vs_nor exhibited when the vehicle speed sensor 20 is normal, and a curve indicated by a one-dot chain line in FIG. 7B indicates a result of a simulation of a normal-time total transmission gear ratio Rg_nor exhibited when the vehicle speed sensor 20 is normal.

As shown in FIGS. 7A and 7B, in a case where a failure occurs at a time point t1 in the vehicle speed sensor 20, although the estimated vehicle speed Vs_hat is temporarily separated from the detected vehicle speed Vs_act thereafter, the estimated vehicle speed Vs_hat converges to the detected vehicle speed Vs_act at a time point t2. Further, the estimated total transmission gear ratio Rg_hat is gently separated from the normal-time total transmission gear ratio Rg_nor after the time point t1. The relationship between the estimated vehicle speed Vs_hat and the detected vehicle speed Vs_act is as described above, and hence in a case where the failure determination of the vehicle speed sensor 20 is performed based on a result of comparison (magnitude relationship) between the estimated vehicle speed Vs_hat and the detected vehicle speed Vs_act, an S/N (signal-to-noise) ratio of the accuracy of failure determination is low. In other words, erroneous determination is liable to occur in the failure determination.

To solve this problem, in the failure determination system 1 of the present embodiment, as shown in the above-mentioned equation (1), the reference vehicle speed Vs_ref is calculated using the estimated total transmission gear ratio Rg_hat (k−nw) which was exhibited at the control time nw times earlier than the current control time, when the vehicle speed sensor 20 was determined to be normal. In such a case, as shown by a result of a simulation illustrated in FIG. 7C, the reference vehicle speed Vs_ref changes similar to the normal time vehicle speed Vs_nor after the failure occurs at the time point t1, so that the reference vehicle speed Vs_ref is separated from the detected vehicle speed Vs_act with the lapse of time, and as the elapsed time period becomes longer, the degree of separation from the detected vehicle speed Vs_act becomes larger.

Figure 7C:
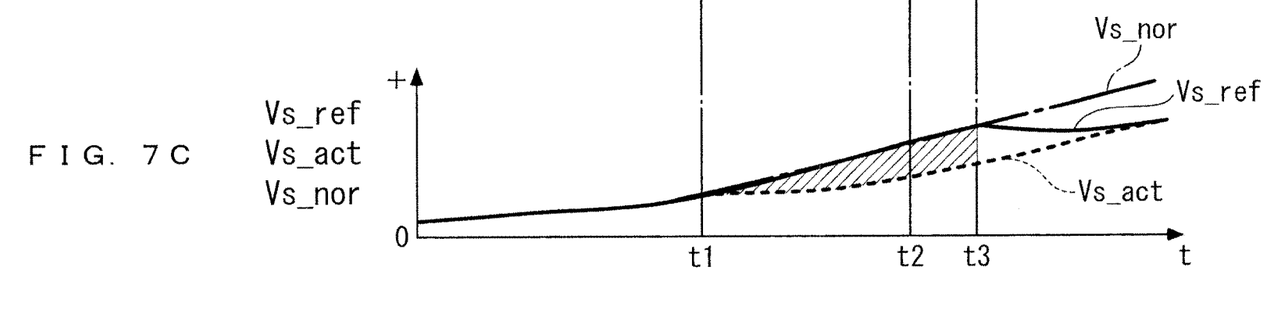
FIG. 7C is a timing diagram showing results of simulations of a reference vehicle speed and the detected vehicle speed acquired when the failure has occurred in the vehicle speed sensor.

In other words, in a case where the failure determination of the vehicle speed sensor 20 is performed based on a result of comparison (magnitude relationship) between the reference vehicle speed Vs_ref and the detected vehicle speed Vs_act shown in FIG. 7C, the S/N ratio is improved compared with the case where the failure determination is performed based on the result of comparison (magnitude relationship) between the estimated vehicle speed Vs_hat and the detected vehicle speed Vs_act, and hence the determination accuracy is improved. Particularly, the area of a region between the reference vehicle speed Vs_ref and the detected vehicle speed Vs_act indicated by hatching in FIG. 7C becomes larger than the area of a region between the estimated vehicle speed Vs_hat and the detected vehicle speed Vs_act indicated by hatching in FIG. 7A, and it is understood that the magnitude relationship between the areas is directly connected to a height relationship between the S/N ratios. Note that a time point t3 in FIG. 7C corresponds to a time when the for-use-in-failure determination value Pv_m≥the predetermined threshold value Th_Pv, referred to hereinabove, is satisfied.

Based on the reason described above, in the failure determination system 1 of the present embodiment, as shown in the above-mentioned equation (2), the for-use-in-monitoring vehicle speed error Ev_m is set to a difference between the reference vehicle speed Vs_ref and the detected vehicle speed Vs_act. Further, in general, the Liapounov function is known as a function for evaluating an error convergence behavior, and when a Liapounov function Ly of the for-use-in-monitoring vehicle speed error Ev_m is defined by a discrete-time system, generally, the Liapounov function Ly is expressed by the following equation (16):

$$Ly(k) = \frac{1}{2} \cdot Ev\_m(k)^2 \tag{16}$$

The function differential value dLy which is a differential value of the Liapounov function Ly, is defined by the above-mentioned equation (3). In this case, since the function differential value dLy is the differential value of the Liapounov function Ly, when the function differential value dLy is a negative value, it indicates that the for-use-in-monitoring vehicle speed error Ev_m has converged to 0, whereas when the same is a positive value, it indicates that the absolute value of the for-use-in-monitoring vehicle speed error Ev_m has increased. In short, by referring to the function differential value dLy, it is possible to determine whether or not the for-use-in-monitoring vehicle speed error Ev_m has increased.

Based on the above-described principle, as shown in the above-mentioned equations (4) to (7), the weighted error Wv_m is calculated by weighted average calculation of the error absolute value Ev_abs_m, which is calculated as the absolute value of the for-use-in-monitoring vehicle speed error Ev_m, and the positive differential value dLy_po, which is calculated as a value other than 0 only when the function differential value dLy is a positive value. Then, as shown in the above-mentioned equation (8), the for-use-in-failure determination value Pv_m is calculated by integrating the thus calculated weighted error Wv_m for an integration time period DT·np, and the failure determination of the vehicle speed sensor 20 is performed based on a result of comparison between the calculated for-use-in-failure determination value Pv_m and the predetermined threshold value Th_Pv. As a consequence, according to the method of determining a failure of the vehicle speed sensor 20 of the present embodiment, it is possible to improve the S/N ratio in the result of the failure determination. Further, compared with a case where the for-use-in-failure determination value Pv_m is calculated by directly using the function differential value dLy and the for-use-in-monitoring vehicle speed error Ev_m, it is possible to quickly obtain the result of the failure determination, as described hereinabove.

Figure 8:
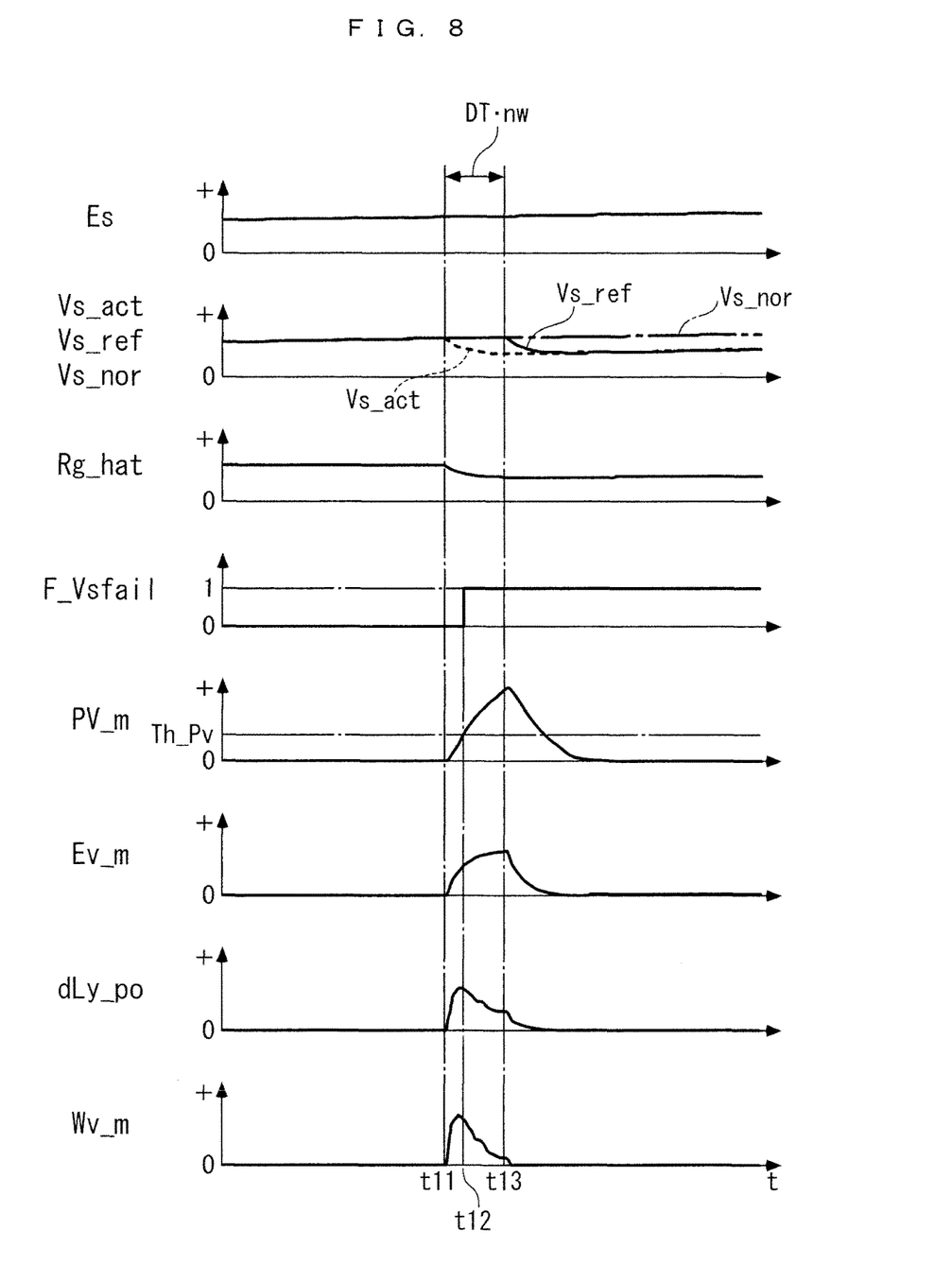
FIG. 8 is a timing diagram showing results of simulation of various parameters used when a failure has occurred in the vehicle speed sensor.

Next, a result of a simulation of the failure determination process by the failure determination system 1 of the present embodiment will be described with reference to FIG. 8. As shown in FIG. 8, when a failure has occurred in the vehicle speed sensor 20 at a time point t11, the detected vehicle speed Vs_act decreases thereafter, and this increases all of the for-use-in-monitoring vehicle speed error Ev_m, the positive differential value dLy_po, and the weighted error Wv_m, so that the for-use-in-failure determination value Pv_m increases.

Then, with the lapse of time, the sensor failure flag F_VsFail is changed from 0 to 1 at a time (time point t12) when Pv_m≥Th_Pv is satisfied. After that, although the for-use-in-failure determination value Pv_m increases along with the increase of the for-use-in-monitoring vehicle speed error Ev_m, the positive differential value dLy_po and the weighted error Wv_m both decrease along with lowering of an increasing rate of the for-use-in-monitoring vehicle speed error Ev_m.

Then, as the value Rg_hat (k−nw) of the estimated total transmission gear ratio, calculated at the control time nw times earlier, started to decrease, the reference vehicle speed Vs_ref starts to decreases at a time (time point t13) when a time period corresponding to the value DT·nw has elapsed, in a manner changing such that Vs_ref becomes closer to the detected vehicle speed Vs_act. Along therewith, the for-use-in-monitoring vehicle speed error Ev_m, the positive differential value dLy_po, and the weighted error Wv_m all decrease, so that the for-use-in-failure determination value Pv_m as well decreases.

As described above, according to the failure determination system 1 of the present embodiment, in the sensor monitoring process in FIG. 2, the engine speed Es is calculated in the step 4 based on the CRK signal from the crank angle sensor 21, then, the detected vehicle speed Vs_act is calculated in the step 5 based on the vehicle speed detection signal from the vehicle speed sensor 20, and the for-use-in-failure determination value Pv_m is calculated in the step 6 with the control algorithm expressed by the above-mentioned equations (1) to (8). Then, in the failure determination process in the step 7, it is determined that the vehicle speed sensor 20 is faulty when the for-use-in-failure determination value Pv_m is not smaller than the threshold value Th_Pv, and in the step 8, the next-time value Rg_hat (k+1) of the estimated total transmission gear ratio is calculated with the control algorithm expressed by the above-mentioned equations (9) to (15).

In this case, since a general vehicle includes an engine speed sensor, such as the crank angle sensor 21, for detecting the rotational speed of the engine, it is possible to always perform the failure determination of the vehicle speed sensor 20 as a vehicle speed detection device, using such an engine speed sensor, without adding a wheel speed sensor as disclosed in Japanese Laid-Open Patent Publication (Kokai) No. 2009-128239. That is, it is possible to realize the failure determination system 1 that satisfies the functional safety standards (ISO26262).

Further, in a case where the estimated vehicle speed Vs_hat at the current time point is calculated using the estimated total transmission gear ratio Rg_hat at the current time point, and the failure determination of the vehicle speed sensor 20 is performed by comparing the estimated vehicle speed Vs_hat and the detected vehicle speed Vs_act, the determination accuracy is lowered due to reduction of reliability of the estimated vehicle speed Vs_hat under a condition that there is a possibility of occurrence of a failure at a time before the current time point. However, according to the failure determination system 1 of the present embodiment, when the answer to the question of the step 1 is affirmative (YES), i.e. if the vehicle speed sensor 20 was determined to be normal at the control time nw times earlier, the reference vehicle speed Vs_ref is calculated using the value Rg_hat (k−nw) of the estimated total transmission gear ratio, calculated at the control time nw times earlier, and the engine speed Es, so that it is possible to calculate the reference vehicle speed Vs_ref as a value of high reliability. As described above, according to the failure determination system 1, it is possible to always perform the failure determination of the vehicle speed sensor 20 with accuracy, and ensure a high marketability, without adding a sensor other than the vehicle speed sensor 20, while avoiding increases in manufacturing costs and product prices of the failure determination system 1.

Furthermore, in the process for calculating the for-use-in-failure determination value Pv_m, the function differential value dLy is calculated as the differential value of the Liapounov function of the for-use-in-monitoring vehicle speed error Ev_ms, and the weighted error Wv_m is calculated by weighted average calculation of the positive differential value dLy_po, which is obtained by selecting only a positive value of the function differential value dLy, and the error absolute value Ev_abs_m, which is the absolute value of the for-use-in-monitoring vehicle speed error Ev_m. Then, the for-use-in-failure determination value Pv_m is calculated as an integrated value of np+1 weighted errors Wv_m calculated as above. In this case, the differential value of the Liapounov function indicates an increase in error when it exhibits a positive value, and hence by using the positive differential value dLy_po, which is obtained by selecting only a positive value of the differential value of the Liapounov function, it is possible to quickly obtain the result of the failure determination result with high accuracy. Further, by using only the absolute value of the for-use-in-monitoring vehicle speed errors Ev_m, it is possible to quickly determine the tendency of the increase in error, compared with the case where the vehicle speed error Ev_m is directly used which can exhibit a positive or negative value. In addition to this, the for-use-in-failure determination value Pv_m is calculated by integrating np+1 weighted average values Wv_m each obtained by weighted average calculation of the two values dLy_po and Ev_abs_m as described above, so that it is possible to improve the S/N ratio in the result of the failure determination, thereby making it possible to improve the accuracy of the failure determination, compared with a case where a weighted average value Wv_m obtained by a single weighted average calculation is used.

Further, the estimated total transmission gear ratio Rg_hat is calculated with the control algorithm expressed by the above-mentioned equations (9) to (15) such that the for-use-in-estimation vehicle speed error Ev_id becomes minimum (i.e. Ev_id becomes equal to 0), and the monitoring time period value nw is set such that the monitoring time period DT·nw becomes sufficiently longer than a time period to be taken before the for-use-in-estimation vehicle speed error Ev_id converges to the minimum value thereof. Therefore, since the for-use-in-failure determination value Pv_m is calculated using the estimated total transmission gear ratio Rg_hat (k−nw) which was calculated at a calculation time nw times earlier, a time for performing the failure determination is set to a time after the for-use-in-estimation vehicle speed error Ev_id has converged to the minimum value, i.e. 0. For the same reason, the integration count value np is set to a value equal to the monitoring time period value nw, and hence the time for performing the failure determination is set to a time after the for-use-in-estimation vehicle speed error Ev_id has converged to the minimum value, i.e. 0. This makes it possible to further improve the determination accuracy.

Furthermore, when the failure determination of the vehicle speed sensor 20 is performed in a state where the motive power of the engine 3 is not transmitted to the drive wheels 6, there is a fear that erroneous determination occurs. However, according to the failure determination system 1, since a failure of the vehicle speed sensor 20 is determined when the motive power of the engine 3 is in a state transmittable to the drive wheels 6, it is possible to avoid such erroneous determination, thereby making it possible to further improve the determination accuracy.

Note that although in the present embodiment, the vehicle speed sensor 20 is used as a vehicle speed detection device, by way of example, the vehicle speed detection device is not limited to this, but any suitable vehicle speed detection device may be used insofar as it is capable of detecting the speed of the vehicle. For example, a vehicle speed detection device of a resolver type or a rotary encoder type may be employed as the vehicle speed detection device.

Further, although in the present embodiment, the failure determination system of the present invention is applied to the four-wheel vehicle V, by way of example, the failure determination system of the present invention is not limited to this, but it can be applied to various vehicles provided with a vehicle speed detection device. For example, the failure determination system of the present invention may be applied to two-wheel or three-wheel vehicles, vehicles with six or more wheels, and caterpillar type vehicles.

Furthermore, although in the present embodiment, the engine 3 is used as the motive power source of the vehicle, by way of example, the motive power source of the present invention is not limited to this, but any suitable motive power source may be used insofar as it generates motive power. For example, there may be used an internal combustion engine powered by light oil, LPG or a mixed fuel, or an electric motor. Further, a combination of the electric motor and the internal combustion engine may be employed.

On the other hand, although in the present embodiment, the crank angle sensor 21 is used as the motive power speed acquisition means, by way of example, the motive power speed acquisition means of the present invention is not limited to this, but any suitable motive power speed acquisition means may be used insofar as it is capable of acquiring motive power speed. For example, there may be used a resolver or a rotary encoder as the motive power speed acquisition means.

Further, although in the present embodiment, the estimated total transmission gear ratio Rg_hat is used as the correlation parameter, by way of example, the correlation parameter of the present invention is not limited to this, but any suitable correlation parameter may be used insofar as it indicates correlation between the vehicle speed and the motive power speed. For example, as the correlation parameter, there may be used the reciprocal of the estimated total transmission gear ratio Rg_hat, or a difference or a ratio between one and the other of the vehicle speed and the motive power speed.

Furthermore, although in the present embodiment, the for-use-in-monitoring vehicle speed error Ev_m is used as the error parameter, by way of example, the error parameter of the present invention is not limited to this, but any suitable error parameter may be used insofar as it indicates an error between the reference vehicle speed and the detected vehicle speed. For example, as the error parameter, there may be used a negative value (−Ev_m) or an absolute value |Ev_m| of the for-use-in-monitoring vehicle speed error. Further, there may be used a ratio (Vs_ref/Vs_act) between the reference vehicle speed Vs_ref and the detected vehicle speed Vs_act, or the reciprocal (Vs_act/Vs_ref) thereof.

On the other hand, although in the present embodiment, the value Pv_m obtained by integrating the weighted average value Wv_m of the positive differential value dLy_po and the error absolute value Ev_abs_m is used as the integrated value, by way of example, the integrated value of the present invention is not limited to this, but any suitable integrated value may be used insofar as it is a value obtained by integrating at least one of the differential value of the Liapounov function of the vehicle speed error and the vehicle speed error, for a predetermined calculation time period. For example, as the integrated value, there may be used a value obtained by integrating the differential value dLy or only the positive differential value dLy_po for a predetermined calculation time period, or a value obtained by integrating the for-use-in-monitoring vehicle speed error Ev_m or only the error absolute value Ev_abs_m for a predetermined calculation time period.

Further, although in the present embodiment, the monitoring time period value nw is set such that nw=np holds, the monitoring time period value nw may be set such that nw>np holds.

Furthermore, although in the present embodiment, the differential values dLy of a general Liapounov function Ly expressed by the equation (16) are used as the differential values of the Liapounov function, byway of example, there is a Liapounov function different in definition from the equation (16), and hence there may be used differential values of such a Liapounov function.

It is further understood by those skilled in the art that the foregoing are preferred embodiments of the invention, and that various changes and modifications may be made without departing from the spirit and scope thereof.

What is claimed is:

1. A failure determination system for a vehicle speed detection device that outputs a vehicle speed detection signal indicative of a vehicle speed which is a speed of a vehicle, comprising:
    detected vehicle speed calculation means for calculating a detected vehicle speed, which is a detection value of the vehicle speed, based on the vehicle speed detection signal;
    motive power speed acquisition means for acquiring a motive power speed, which is a speed of a motive power source of the vehicle;
    correlation parameter calculation means for calculating repeatedly at a predetermined period, a correlation parameter indicative of a correlation between the vehicle speed and the motive power speed;
    storage means for storing the calculated correlation parameter;
    reference vehicle speed calculation means for calculating a reference vehicle speed, using one of the previously calculated correlation parameters that was calculated at a calculation time earlier than a current time point by a predetermined time period and when it was determined that the vehicle speed detection device is normal and stored in said storage means, and the motive power speed; and
    failure determination means for determining a failure of the vehicle speed detection device, using an error parameter indicative of an error between the reference vehicle speed and the detected vehicle speed.

2. The failure determination system according to claim 1, wherein said failure determination means determines the failure of the vehicle speed detection device, using the error parameter calculated when the motive power of the motive power source is in a state transmittable to drive wheels of the vehicle.

3. The failure determination system according to claim 1, wherein said reference vehicle speed calculation means calculates the reference vehicle speed, using the correlation parameter calculated when it was determined the predetermined time period earlier than the current time point that the vehicle speed detection device is normal, and the motive power speed.

4. A failure determination system for a vehicle speed detection device that outputs a vehicle speed detection signal indicative of a vehicle speed which is a speed of a vehicle, comprising:
detected vehicle speed calculation means for calculating a detected vehicle speed, which is a detection value of the vehicle speed, based on the vehicle speed detection signal;
motive power speed acquisition means for acquiring a motive power speed, which is a speed of a motive power source of the vehicle;
correlation parameter calculation means for calculating a correlation parameter indicative of a correlation between the vehicle speed and the motive power speed;
storage means for storing the calculated correlation parameter;
reference vehicle speed calculation means for calculating a reference vehicle speed, using the correlation parameter calculated at a calculation time a predetermined time period earlier than a current time point and stored in said storage means, and the motive power speed; and
failure determination means for determining a failure of the vehicle speed detection device, using an error parameter indicative of an error between the reference vehicle speed and the detected vehicle speed,
wherein the error parameter is a vehicle speed error which is a difference between one and the other of the reference vehicle speed and the detected vehicle speed, and
wherein said failure determination means determines the failure of the vehicle speed detection device, using a differential value of a Liapounov function of the vehicle speed error, which is a value derived using differentiation of the Liapounov function.

5. A failure determination system for a vehicle speed detection device that outputs a vehicle speed detection signal indicative of a vehicle speed which is a speed of a vehicle, comprising:
detected vehicle speed calculation means for calculating a detected vehicle speed, which is a detection value of the vehicle speed, based on the vehicle speed detection signal;
motive power speed acquisition means for acquiring a motive power speed, which is a speed of a motive power source of the vehicle;
correlation parameter calculation means for calculating a correlation parameter indicative of a correlation between the vehicle speed and the motive power speed;
storage means for storing the calculated correlation parameter;
reference vehicle speed calculation means for calculating a reference vehicle speed, using the correlation parameter calculated at a calculation time a predetermined time period earlier than a current time point and stored in said storage means, and the motive power speed; and
failure determination means for determining a failure of the vehicle speed detection device, using an error parameter indicative of an error between the reference vehicle speed and the detected vehicle speed,
wherein the error parameter is a vehicle speed error which is a difference between one and the other of the reference vehicle speed and the detected vehicle speed,
wherein said failure determination means determines the failure of the vehicle speed detection device, using an integrated value obtained by integrating at least one of a differential value of a Liapounov function of the vehicle speed error and the vehicle speed error, for a predetermined calculation time period, and
wherein the differential value is a value derived using differentiation of the Liapounov function.

6. The failure determination system according to claim 5, wherein said correlation parameter calculation means calculates an estimated vehicle speed based on the correlation parameter and the motive power speed, calculates an estimated error between the detected vehicle speed and the estimated vehicle speed, and calculates the correlation parameter with a predetermined control algorithm such that the estimated error becomes minimum, and
wherein the predetermined calculation time period is set to a value longer than a time period to be taken before the estimated error converges to a minimum value thereof.

7. A failure determination system for a vehicle speed detection device that outputs a vehicle speed detection signal indicative of a vehicle speed which is a speed of a vehicle, comprising:
detected vehicle speed calculation means for calculating a detected vehicle speed, which is a detection value of the vehicle speed, based on the vehicle speed detection signal;
motive power speed acquisition means for acquiring a motive power speed, which is a speed of a motive power source of the vehicle;
correlation parameter calculation means for calculating a correlation parameter indicative of a correlation between the vehicle speed and the motive power speed;
storage means for storing the calculated correlation parameter;
reference vehicle speed calculation means for calculating a reference vehicle speed, using the correlation parameter calculated at a calculation time a predetermined time period earlier than a current time point and stored in said storage means, and the motive power speed; and
failure determination means for determining a failure of the vehicle speed detection device, using an error parameter indicative of an error between the reference vehicle speed and the detected vehicle speed,
wherein said correlation parameter calculation means calculates an estimated vehicle speed based on the correlation parameter calculated at a calculation time one time earlier than the current time point and the motive power speed, calculates an estimated error between the detected vehicle speed and the estimated vehicle speed, and calculates the correlation parameter with a predetermined control algorithm such that the estimated error becomes minimum, and
wherein the predetermined time period is set to a value longer than a time period to be taken before the estimated error converges to a minimum value thereof.

* * * * *